United States Patent [19]

Montorio

[11] 4,303,875
[45] Dec. 1, 1981

[54] DEVICE FOR THE REMOTE CONTROL OF THE ANGULAR POSITION OF AN AERIAL ROTOR

[76] Inventor: Salvatore Montorio, Via Liberta 23-S.Donato, Milanese, Italy

[21] Appl. No.: 41,992

[22] Filed: May 24, 1979

[30] Foreign Application Priority Data

May 31, 1978 [IT] Italy .................. 24057 A/78

[51] Int. Cl.³ .............................................. G05B 1/06
[52] U.S. Cl. ................................... 318/667; 318/674; 318/678; 318/681; 307/2; 307/26; 340/310 R
[58] Field of Search ............... 318/677, 678, 681, 674, 318/663, 667; 340/310 R, 310 A; 307/2, 26

[56] References Cited

U.S. PATENT DOCUMENTS

| | | | |
|---|---|---|---|
| 3,155,889 | 11/1964 | Stiles et al. | 318/674 |
| 3,200,314 | 8/1965 | Iroler | 318/674 |
| 3,311,831 | 3/1967 | Leppert | 307/2 |
| 3,435,358 | 3/1969 | Rheinfelder | 340/310 R |
| 3,839,676 | 10/1974 | Linnecar | 340/310 R |

Primary Examiner—J. V. Truhe
Assistant Examiner—Eugene S. Indyk

[57] ABSTRACT

A device for the remote control of the angular position of an aerial rotor comprising a d.c. motor for the rotation of the rotor and a drive circuit adapted to cause the rotation of the motor in one direction when it receives as input a d.c. voltage higher than a reference value and in the opposite direction when it receives as input a d.c. voltage lower than the reference value. The device provides for a feeder, in proximity of the receiver, for generating at least one d.c. control voltage and comprising a regulator of the value of the voltage as a function of the desired angular position of the rotor of the aerial, and a regulator and stabilizor of the d.c. control voltage, located in proximity of the drive circuit of the motor, to obtain from the d.c. control voltage a stabilized constant voltage of a value lower than the minimum value of the d.c. control voltage, for the feeding of the drive circuit and the motor. The connection between the feeder and the regulator and stabilizor is effected through the cable for RF signals between the aerial and the receiver.

6 Claims, 3 Drawing Figures

DEVICE FOR THE REMOTE CONTROL OF THE ANGULAR POSITION OF AN AERIAL ROTOR

BACKGROUND OF THE INVENTION

The present invention relates to an electronic device for the control of a drive motor of a steerable aerial, particularly for a TV receiving aerial.

It is known that the use of TV aerials has become more widespread, which can be rotatably adjusted, with which aerials the user can obtain the best reception by varying, as a function of the selected channel, the direction of his aerial.

There have been realized various types of control circuits, more or less sophisticated, to permit easy and exact regulation of the position of the aerial. The devices presently known, however, require for the connection between the receiver and the drive motor of the aerial, an additional and independent electric connection which is to be added to the indispensable one of the aerial cable.

This makes extremely difficult and complicated the installation of an angularly adjustable aerial since it is necessary to provide for two separate electric connections, respectively for connecting the aerial to the TV receiver and the aerial drive motor to its control circuit, located near the TV.

The aforementioned inconvenience is felt even more when one wishes to replace a fixed type aerial with a steerable aerial. In fact, in this case, it is necessary to effect a supplemental connection between the drive motor and the control circuit, since the aerial cable, already installed, continues to perform only its function of carrying the RF signals.

SUMMARY OF THE INVENTION

It has now been devised an electronic device for the control of a drive motor for a rotatable TV aerial which overcomes the aforementioned inconvenience.

According to the main feature of the electronic device of the present invention, the connection between the latter and the drive motor of the rotatable aerial is effected by means of the same coaxial cable normally used for the connection between the aerial and the TV set, eliminating the need of supplying an additional connection and thus simplifying the installation operations, which thus are much less expensive.

As will appear clearer from the description which follows, the device of the present invention consists essentially of two parts, one of which is installed at the aerial, connected to the drive motor, and the other of which is installed near the TV receiver of the user.

The connection between the two parts takes place solely by means of a standard coaxial cable which connects the aerial to the TV receiver.

The device according to the present invention for the remote control of the angular position of an aerial rotor, comprising a d.c. motor for the rotation of the rotor and a drive circuit adapted to cause the rotation of the motor in one direction when it receives as input a d.c. voltage higher than a reference value and in the opposite direction when it receives as input a d.c. voltage lower than said reference value, is characterized by feeding means, in proximity of the receiver, for generating at least one d.c. control voltage and comprising a regulator of the value of said voltage as a function of the desired angular position of the rotor of the aerial, and regulation and stabilization means of said d.c. voltage, located in proximity of the drive circuit of the motor, to obtain from said d.c. control voltage a stabilized constant voltage of a value lower than the minimum value of said d.c. control voltage, for the feeding of the drive circuit and of the motor, further characterized by the fact that the connection between said feeding means and said regulation and stabilization means is effected through the cable for the RF signal between the aerial and the receiver.

According to a first embodiment of the invention, the device provides the temporary selective connection between the feeding means and the motor during the orientation of the same and the permanent connection between the feeding means and the eventual antenna amplifier.

According to another embodiment, the device provides the steady feeding of the motor and of its drive circuit when the aerial amplifier is not provided for.

BRIEF DESCRIPTION OF THE DRAWINGS

The characteristics of the electronic device according to the present invention will become clearer in view of the following detailed description of two preferred embodiments, set forth by way of illustration and not of limitation, with reference to the attached drawings in which:

With reference to FIGS. 1 and 2, the device according to the present invention comprises a feeder adapted to furnish as output a stabilized voltage and consisting essentially of a power supply circuit indicated in its whole with the reference 1 and by a stabilizing circuit indicated with 2.

Figure 1:
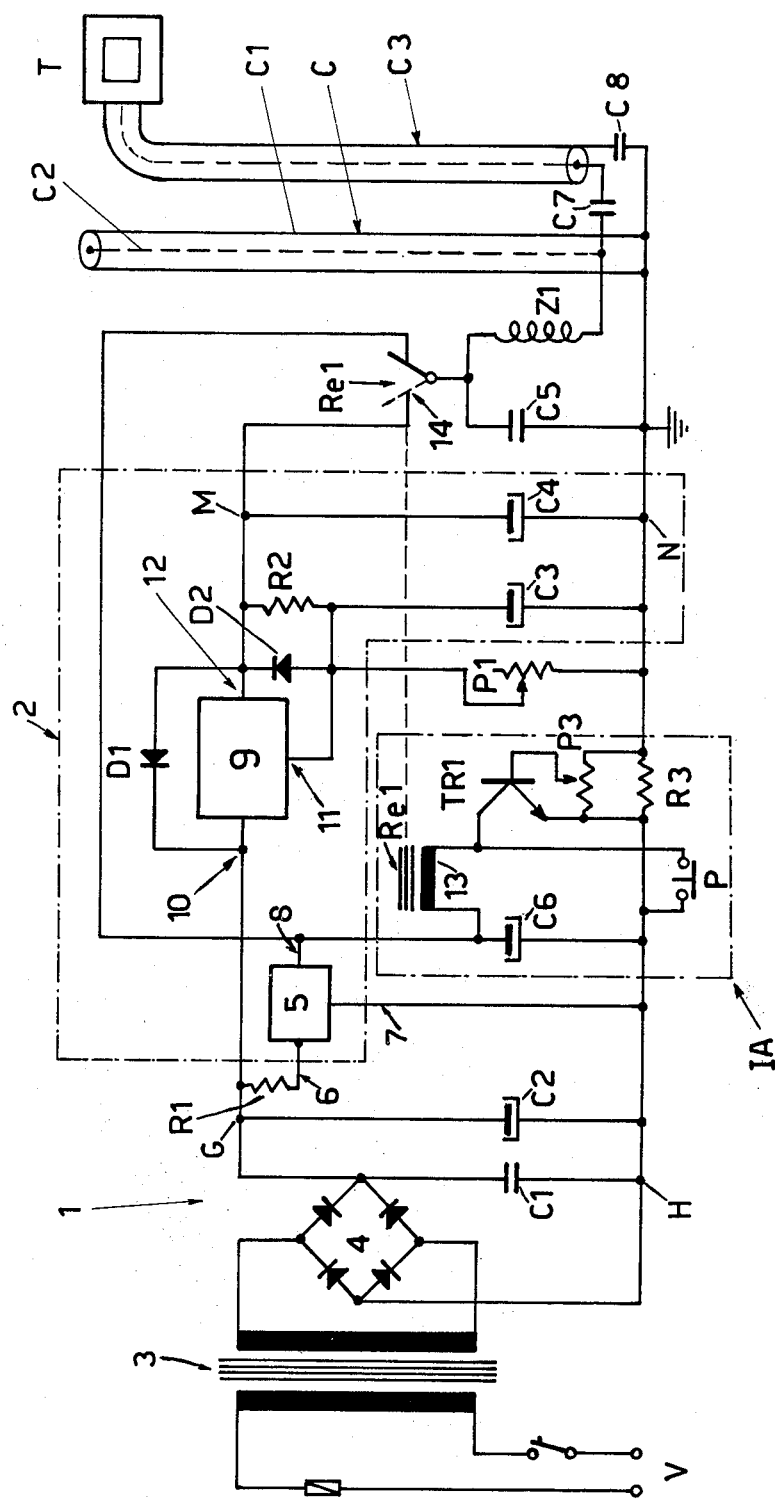
FIG. 1 shows the circuit portion which is to be installed near the TV receiver.

The power supply circuit 1 is composed of a step down transformer 3, a bridge rectifier circuit 4 and two condensers C1 and C2, respectively a by-pass condenser and an electrolytic filter condenser.

The rectified voltage as output from the bridge circuit 4 is applied to a first stabilizer 5 consisting of an integrated circuit adapted to effect a first leveling of the voltage generated by the bridge circuit 4. The stabilizing circuit 5 may be advantageously the integrated circuit known as LM 340 15, produced by National, having an output stabilized voltage of 15 V.

An input terminal 6 is connected to the rectifying system through a resistor as protection against overloads, e.g. 10 ohms, while a filter condenser C6 is provided on the output terminal 8.

The voltage stabilizer 2, of which the above-described stabilizing circuit 5 is a part, comprises also a second voltage stabilizer 9 consisting advantageously of the integrated circuit known as LM 317, produced by National.

The second stabilizing circuit represents, in the traditional manner, the necessary components for protection and polarization. Said components comprise, in the illustrated embodiment, a protection diode D1 inserted between the terminals 10 and 12 of the circuit 9, a resistor R2 and a negative biasing diode D2 for the terminal 11, inserted between the latter and the terminal 12. The condensers from C3 to C5 are respectively polarization, filter and bypass condensers while C6 is another filter condenser.

As is apparent from FIG. 1, the feeding circuit is able to supply two output voltage values. A first voltage value, in particular the above stated 15 volts, is available at terminal 8 of the circuit 5 while a second voltage, adjustable and higher than the first one, is available at terminal 12 of circuit 9. The relay Re1, which will be discussed further on, permits to forward one or the other of said voltages to the aerial cable C.

The variations of the second voltage are obtained by the regulating circuit 9 under control of a potentiometric circuit P1 inserted between ground and the terminal 11 of the circuit 9, capable of changing the output voltage on said terminal between 18 and 25 volts.

Preferably P1 is a potentiometer of the rotatable type so that its circular scale of resistances may be graduated directly in azimuth degrees.

With C is indicated a standard coaxial aerial cable which, according to the present invention, permits both the connection of the aerial with the TV receiver and the connection of the control circuit with the drive circuit.

The outer ground-connected sheat C1 is shown with a continuous line, while the inner conductor C2, indicated with a dashed line, is connected to the central contact of switch 14 of relay Re1. An impedance Z1 is provided in series with the inner conductor C2 so as to prevent the RF signals from entering the afore described feeding circuit.

The connection of the aerial cable C to the TV receiver T is realized by means of an additional length of cable, indicated with C3, connected at one end to the TV receiver T and, at the other end, to an output of the feeding circuit.

Said output has thereon, for the connection of cable C3, a condenser C7, in series between cable C3 and cable C, which connects the aerial to the TV receiver T and permits only the passage of the RF signals coming from the cable C, blocking the d.c. voltages coming from the feeder so as to prevent them from entering the TV receiver T. With C8 there is indicated a standard filter or bypass condenser.

From what has been described above, it appears clear that on the aerial cable C there are present both d.c. voltages from the feeding circuits and RF signals from the aerial. The separation between the d.c. voltages and the RF signals is effected in the manner described above, eliminating any interference between each other.

The device according to the present invention comprises also a circuit, indicated in its whole with IA, which is adapted to feed the motor until the aerial has reached the desired position.

The connection and self-feeding circuit IA comprises the relay Re1, having an energization winding 13 connected at one end to the terminal 8 of circuit 5 and, at the other end, through a push-button P, to ground. The push-button P, which in rest condition has its contacts open, permits to energize winding 13 of relay Re1 by means of the voltage between terminals 7 and 8 of the circuit 5.

Between an end of winding 13 and the push-button P is connected the collector of a transistor TR1 of the n-p-n type, the emitter of which is connected to the negative terminal of the feeder.

Between the base of the transistor TR1 and its emitter there is inserted a potentiomentric circuit P3 for the initial setting of the operating voltage of said transistor, while the base polarization is obtained with resistor R3.

The switching equipment of relay Re1 is illustrated schematically as a two-position switch 14 between two terminals connected respectively to terminal 12 of the circuit 9 and to terminal 8 of the circuit 5. The dashed line connecting winding 13 with switch 14 indicates schematically the movable nucleus of relay Re1.

Making now particular reference to FIG. 2, there will now be described the portion of the device which is to be installed near the aerial.

With the letter A there has been indicated schematically an aerial of the traditional type connected through a length of cable C4, always of the coaxial type, to the end of the aerial cable C for carrying RF signals to the TV receiver. Between the inner conductors there is inserted a coupling condenser C9 to prevent the d.c. voltages from the aerial cable C from reaching aerial A through segment C4. On the other hand, said condenser C9 permits the passage of RF signals from aerial A to the TV receiver T.

The part of the device according to the present invention, forming the drive circuit, comprises a stabilizing circuit 15 preferably consisting of the integrated circuit known as LM 340 12, produced by National, which is employed to feed both the rotation motor 20 and the drive circuit of the same. The input terminal 16 is connected, by means of a resistor R4 and an impedance Z2', to the inner conductor C2 of the aerial cable C. Resistor R4 is provided to protect the circuit 15 from eventual voltage overloads, while impedance Z2' permits the passage only to the d.c. voltage to feed eventual aerial amplifiers or converters, blocking the passage of the return RF signals.

As the junction of resistor R4 and impedance Z2' there is derived a threshold circuit comprising a Zener diode Z2 serially connected with a protection resistor R5.

The Zener diode Z2 is provided for blocking the d.c. voltage from the feeding circuit when it is at a lower value, i.e., 15 volts in the illustrated example, when the switch 14 is in the position illustrated with a continuous line. When the feeding circuit supplies a voltage at a higher level, with the switch 14 in the position illustrated with a dashed line, the diode Z2 begins to conduct and causes the energization of a relay Re2, the winding of which is connected between said Zener diode Z2 and the ground of the circuit. The energization of the relay Re2 causes the closing of a feeding contact 19 so that the output voltage from the circuit 15 is applied to a potentiometric circuit P2.

The potentiometric circuit P2 is composed of a rotatable-type potentiometer, the movable contact of which is secured to the rotor of the motor. In FIG. 2 this is schematically shown by the dashed line connecting the axis of the drive motor 20 with the arrow 21 which indicates schematically the movable contact. This arrangement allows for each rotation of the first potentiometric circuit P1 in the feeding circuit, an equal rotation of the movable contact of the second potentiometric circuit P2 and thus of the rotor of the drive motor 20.

With Z1 there is indicated a Zener diode, inserted in parallel with the potentiometric circuit P2, for stabilizing the output voltage from circuit 15 to eliminate possible voltage changes which might damage the part of the circuit downstream of the potentiometric circuit P2. With R6 there is indicated a load resistor inserted in series with the potentiometric circuit P2 to limit possible overvoltages.

The device according to the present invention comprises, between the motor 20 and the output of the stabilizing circuit 15, a double operational amplifier 22, consisting of amplifiers A1 and A2, shown within a dashed-line rectangular, e.g. an LM 378 circuit, produced by National, but obviously it is possible to utilize any other amplifier having similar operating characteristics.

The feeding terminal 23 of the amplifier 22 is connected to the feeding contact 19 upstream of the resistor R6. The central terminal is connected directly to ground while terminals 28 and 30 are connected to the motor 20.

The working of the drive circuit is analogous to that of a Wheatstone bridge in which the error voltage (when the bridge is not balanced) is applied respectively between the inputs 24, 26 and the inputs 25, 27 of the amplifiers. Said voltage difference thus causes the conduction of one of the two amplifiers and the cut off of the other. The output of the conducting amplifier thus rises to a positive potential (that of the feeding terminal 23) while that of the cut off amplifier remains at a negative or ground potential (that of the feeding terminal 29) and therefore a voltage with a well defined polarity is applied to the terminals of motor 20 so that it turns in one direction. Said rotation determines a rotation of the cursor 21 of the potentiometer P2 up to the point when the voltage difference between the pairs of terminal 24, 26 and 25, 27 goes again back to zero, cutting off both amplifiers and stopping the motor.

There is thus established a relationship between the angular position of the rotor and that of potentiometer P1. The reference voltage for the terminal 25 is obtained by means of the voltage divider composed by resistors R13, R14 and potentiometer P2 in series with said resistors. A divider formed by R10 and R11 feeds the terminal 27 while through the resistor R7 are fed terminals 24 and 26 (the latter by means of the divider R8, R9) with the control voltage coming from the cable. The values of R8 and R10 are about 1 ohm to obtain a slight difference in the feed voltage between the input terminals.

With C10 there is indicated a shunt condenser connected on terminals 24, 25 to prevent self-oscillating of amplifiers A1 and A2.

Across the terminals of motor 20 there are shown two condensers C11 and C12, connected to ground, capable of effecting a filtering action to absorb the eventual flashing or sparking which might influence negatively the reception of the RF signal.

Figure 2:
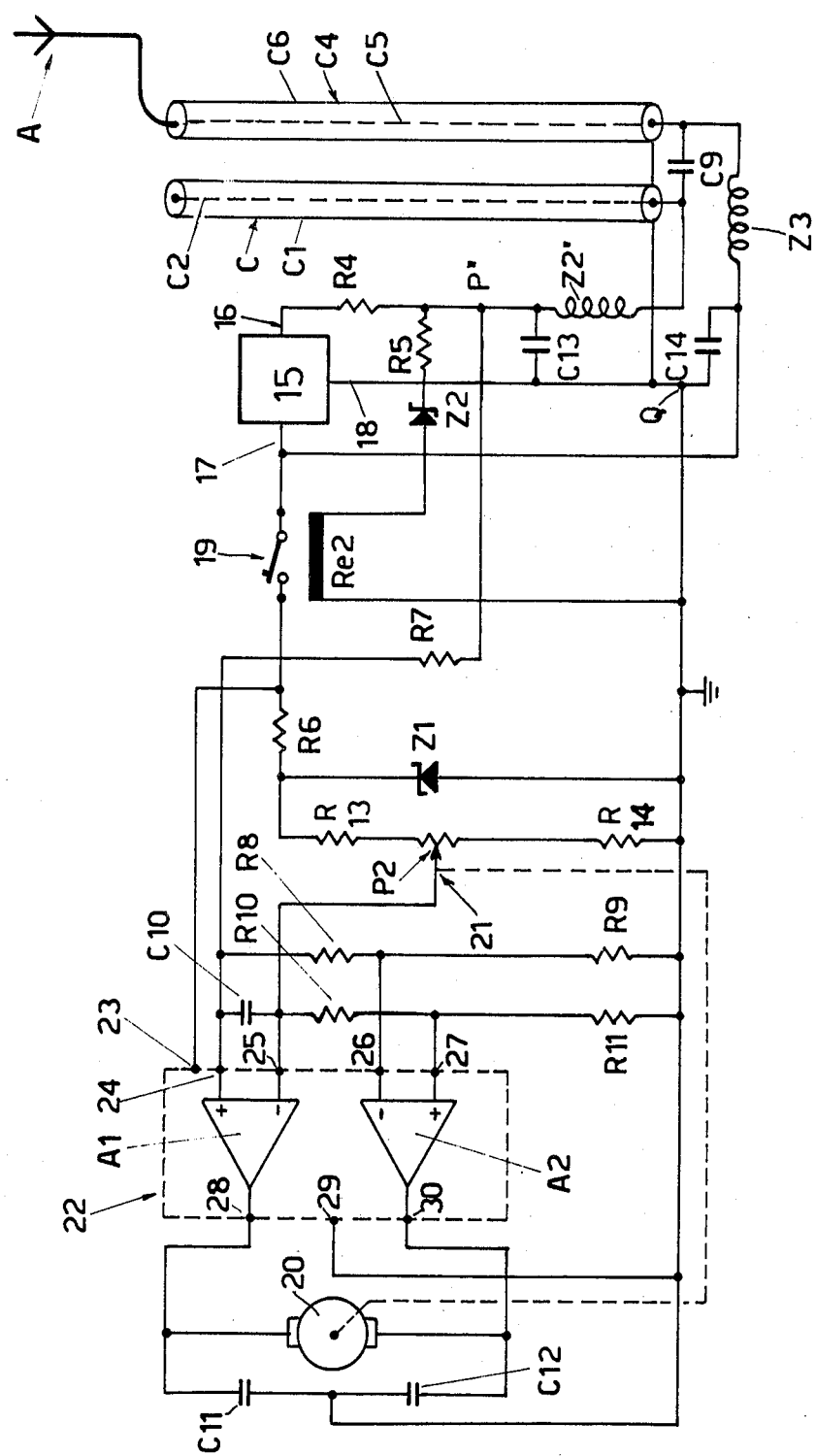
FIG. 2 shows the circuit portion which is to be installed near the aerial.

The working of the device according to the present invention is the following, making now reference to FIGS. 1 and 2, starting from a certain condition in which the aerial is oriented in a direction from which the user wishes to move said aerial for the reception of a different channel.

Under these conditions, the switch 14 of the relay Re1 is as illustrated with a continuous line and the feeding circuit supplies the voltage at a lower level, i.e. the 15 volts of the stabilizing circuit 5 to feed the conventional antenna amplifier, connected between C9 and the RF blocking impedance Z3. Said voltage is not sufficient to make diode Z2 conductive, being less than the threshold level and therefore relay Re2 remains de-energized with the feeding contact 19 in the open position. No voltage is thus applied to potentiometric circuit P2 at this stage.

When the user wishes to change the orientation of his aerial, he moves the sliding contact on potentiometric circuit P1, thus varying the output voltage of the feeding circuit.

For the transmission of said voltage to the drive circuit at the aerial A, he pushes the activating push-button P causing the excitation of the relay Re1. The switch 14 moves to the position illustrated with a dashed line, thus permitting the application of the voltage generated by the feeding circuit to the coaxial cable C. The high current absorption due to the operation of the motor creates a voltage difference on resistor R3 sufficient to directly bias the base of TR1, thus maintaining it in a conductive state. The transistor TR1 causes the relay Re1 to remain energized until the motor stops.

The d.c. voltage does not reach the TV receiver T due to the presence of the condenser C7 decoupling the segment of cable C3 from the feeding circuit as to the d.c. voltages.

The d.c. voltage at the terminals of the coaxial cable C is applied to the actual drive circuit of FIG. 2 and in particular it is applied to the stabilizing circuit 15. The condenser C9 prevents the d.c. voltage from reaching the aerial A.

Since the voltage applied exceeds the threshold value of the Zener diode Z2, the latter goes into a conductive state causing the energization of relay Re2 and the closing of the feeding contact 19, thus applying the voltage from stabilizer 15 to the potentiomentric circuit P2.

Since said voltage is obviously different from that corresponding to the actual position of the potentiometric circuit P2, there is created an unbalance in one of the two amplifiers A1 and A2 of the operational amplifier 22.

For example, if the user rotates potentiometric circuit P1 so as to lower the voltage generated by the feeder circuit, there is unbalanced the input of the amplifier 22 consisting of the terminal 24 and the amplifier A1 goes into a conductive state.

Its output terminal 28 reaches at a positive potential with respect to ground. This permits the feeding of the motor 20 which begins to rotate causing a corresponding rotation of aerial A.

At the same time, the movable contact 21 of the potentiometric circuit 22, bound to the rotor of the motor 20, moves on the resistor varying the value of the voltage between said sliding contact 21 and ground. When said voltage value equals the voltage generated by the feeding circuit, there is no longer any imbalance at amplifier 22 and thus amplifier A1 cuts off and terminal 28 returns to zero potential. During the conduction of amplifier A1, amplifier A2 remained cut off. The working in the case of rotation in the opposite direction is similar.

It is to be understood that, at the end of each rotation of motor 20 both for an increase or for a decrease of the voltage generated by the feeding circuit, the restoration of the equilibrium conditions implies the de-energizing of relay Re2 and thus the opening of the feeding contact 19. Consequently relay Re1 becomes de-energized (stoppage of the motor and thus cut off of TR1) and the switch 14 returns to its initial position.

The voltage returns to the lower level which is not sufficient to exceed the threshold of the Zener diode Z2 and the device remains in the condition it has reached.

In the illustrated device a d.c. voltage is always available at the aerial cable (between C9 and Z3) for the feeding of the eventual aerial amplifier when the rotor is in a rest position. Said voltage, coming from the stabilizer 15, is however applied to the drive circuit only when it is necessary for turning the rotor, by means of the relay Re2.

Figure 3:
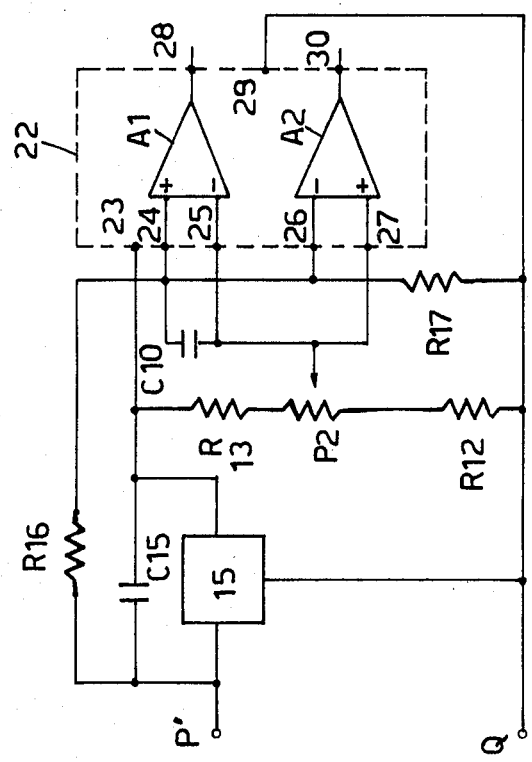
FIG. 3 shows a simplified embodiment of a device according to the invention.
Figure 3:
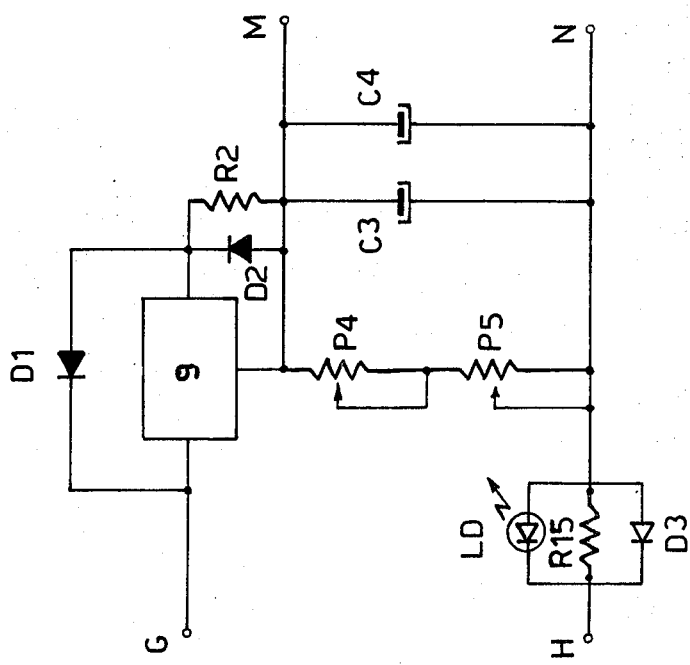

According to another embodiment, illustrated in FIG. 3, when the aerial amplifier is not present it is possible to further simplify the device. In said figure, for the sake of simplicity, there have been omitted the parts common to the previous embodiment and there have been used the same references for the same components. According to said embodiment, the rectified voltage, available at terminals G and H, is varied and stabilized only through a regulator 9 and a potentiometric circuit such as that previously described, and applied constantly to the aerial cable. The potentiometric circuit is, in this case, composed by a potentiometer P4 and a setting trimmer P5, while there is provided a resistor R15 and a LED diode, LD to signal visually the rotation of the motor. A diode D3, in parallel with the resistor R15, acts as current limiter. The points M and N correspond to the same points M and N of the circuit of FIG. 1.

On the right portion of FIG. 3 there is shown the drive circuit near the aerial which is fed, continuously and directly (between the points P' and Q), with the control voltage. The regulator 15 still supplies a reduced and stabilized output voltage for the feeding of the motor 20 and of the circuit 22 while, through the resistor R16, the continuous control voltage is applied to the terminals 24 and 26. There is provided a single polarization resistor R17 for said inputs, and a condenser C15 prevents oscillations of circuit 15. According to this simplified embodiment, the drive circuit always receives the d.c. control voltage and is constantly fed. However, since the error voltage is zero, the rotor remains still. When the user rotates the potentiometric P1, the voltage error will cause the movement of the rotor, which will be indicated visually to the user by the lighting-up of the LED.

Variations and/or modifications may be made to the device according to the present invention without thus departing from the scope of the invention.

In particular, the various circuit components may be modified or substituted in a substantially equivalent manner without departing from the gist of the invention, which is that of providing means adapted to permit the operation of a drive motor of a steerable aerial by the transmission of the necessary d.c. signals by means of the same coaxial cable of the aerial which normally connects the aerial with the TV receiver. In particular, it is possible to cut off the drive circuit by providing a pole changer in place of the relay Re1, connected to a diode bridge rectifying circuit permanently connected to the aerial amplifier with its two terminals. With the remaining terminals there is obtained, by reversing the sign thereof, the exclusion or not of the control circuit to which it is connected. In addition, it is possible to insert an instrument which indicates the position of the rotor, for example a digital voltmeter supplied by a voltage stabilizer, which indicates more effectively the position of the aerial.

What I claim is:

1. A device for remote controlling the rotational position of an aerial of a receiver by a reversible electrical d.c. motor comprising:
    feeding means for generating a d.c. control voltage comprising a voltage regulator having an output voltage variable in accordance with the desired rotational position, said value being higher than a prefixed reference value;
    a connection cable for conveying RF signals picked up by the aerial to the receiver, along such cable, said d.c. control voltage being simultaneously applied to a drive circuit of the d.c. motor; and
    a drive circuit for said motor including means for detecting said d.c. control voltage and for recovering said d.c. reference voltage from the control voltage, the latter being a power supply voltage.

2. A device according to claim 1, wherein the drive circuit comprises two operational amplifiers the outputs of which are connected to the terminals of the motor, each of said amplifiers having a first input connected to a sliding contact of a rotor potentiometer which supplies a polarization voltage proportional to the rotational position of the rotor and a second input fed by said d.c. control voltage.

3. A device according to claim 2, wherein said feeding means further supply a d.c. stabilized voltage lower than the d.c. control voltage and relay means for the temporary connection of said control voltage to the drive circuit.

4. A device according to claim 2, wherein said relay means comprises a first relay excited by the closing of a switch to apply to the connection cable the d.c. control voltage and a second relay energized by said d.c. control voltage through a threshold circuit, to feed the amplifiers, the motor and the rotor potentiometer.

5. A device according to claim 4, wherein said threshold circuit comprises a Zener diode connected between the energizing winding of the second relay and the connection cable.

6. A device according to claim 5, wherein said regulation and stabilization means comprises a stabilizing circuit fed by said stabilized d.c. voltage, when the rotor is stopped, and by said d.c. control voltage when the rotor is rotating, and in which the first relay is kept energized by a transistor maintained in conduction by the current absorbed by the motor.

* * * * *